United States Patent [19]
Bartoldus et al.

[11] Patent Number: 5,793,764
[45] Date of Patent: Aug. 11, 1998

[54] LAN SWITCH WITH DISTRIBUTED COPY FUNCTION

[75] Inventors: Robert William Bartoldus, Raleigh; Brian Mitchell Bass; Kenneth H. Potter, Jr., both of Apex; William Craig Troop, Raleigh, all of N.C.

[73] Assignee: International Business Machines Corporation, Armonk, N.Y.

[21] Appl. No.: 614,221

[22] Filed: Mar. 12, 1996

[51] Int. Cl.$^6$ .................................................. H04L 12/56
[52] U.S. Cl. ................................ 370/390; 370/420
[58] Field of Search ................................ 370/359, 360, 370/364, 390, 420

[56] References Cited

U.S. PATENT DOCUMENTS 5,202,885  4/1993  Schrodi et al. .......................... 370/390
5,251,203  10/1993  Thompson .............................. 370/246
5,309,433  5/1994  Cidon et al. ............................ 370/390
5,394,402  2/1995  Ross ..................................... 370/404

FOREIGN PATENT DOCUMENTS

0364224  3/1991  Japan .

Primary Examiner—Benedict V. Safourek
Attorney, Agent, or Firm—Joscelyn G. Cockburn

[57] ABSTRACT

A LAN switching system includes an Address Match Control line which can be set (activated) and is monitored by each port adapter card. If a port adapter card recognizes an address on the switch fabric, the adapter card copies the frame with the address and activates the Address match Control line. The set Address Match Control line causes the remaining port adapter cards to stop searching for a match. If the Address Match Control line is not set, the frame can be copied by all port adapters which are configured to do so.

16 Claims, 5 Drawing Sheets

LAN SWITCH WITH DISTRIBUTED COPY FUNCTION

BACKGROUND OF THE INVENTION

1. Field of the Invention

The present invention relates to Local Area Networks (LAN) in general and, in particular, to devices for interconnecting such networks.

2. Prior Art

It is well known that the overall performance and bandwidth of LANs are improved when interconnected by LAN switches. As a consequence, there has been a steady increase in the demand for LAN switches and switch manufactures have responded with a proliferation of switches.

The conventional LAN switch is consisted of one or more port adapter cards connected to a switching fabric, such as a bus or the like. Each port adapter card examines frames, currently being passed on the switching fabric, to determine if the frames are to be directed to its LAN port. The determination requires examining information, such as MAC addresses, in the Routing Information (RI) field of the frame and comparing the information with information stored in the port adapter card. If there is a match, the port adapter card copies the frame and forwards it to its LAN port for transmission to the attached LAN segment and attached device.

Broadly speaking, LAN switches may be classified into two types, namely: low cost dedicated LAN switches and higher cost shared media LAN switches. The dedicated LAN switches typically support one/or a very limited number of stations(s) connected to each port. Consequently, the port adapter card must recognize only a few destination MAC addresses in order to decide which frame to copy from the switch fabric. The destination MAC addresses are set in programmed registers directly embedded in the VLSI module, provided on each port adapter card.

Even though the low cost dedicated LAN switches work well for their intended use, they are beset with several problems. One of the problems is that the number of stations on a port has to be kept low to minimize VLSI cost. Another problem is that once the switch is manufactured, the number of stations which can be connected to a port is fixed and the user cannot add additional stations even though the user's installation may require the addition of new stations. This seems to create unnecessary restrictions on the user.

The higher cost shared media LAN switches support large numbers of stations on each port as well as bridges and stations connected to the bridges, but at a much higher cost. To support the large numbers of stations, the port adapter cards must recognize their MAC addresses on the switching fabric. In a typical switch, as many as eight thousand (8000) stations could be connected to ports of the switch and the port adapter cards would have to recognize a like number of MAC addresses. It is not cost effective, in current VLSI technology, to support such large look-up tables internally to the VLSI chip or module. Instead, the look-up table is provided externally to the chip, via contents addressable memories (CAM) and other look-up schemes using other memories and associated circuitry or the like. In addition to their higher cost, the switch does not address the problem of allowing the user to add additional stations beyond the maximum number of stations allowed when the switch was manufactured.

While a number of prior art patents (e.g., U.S. Pat. Nos. 5,394,402; 5,251,203 and JA0064224) provides devices and techniques for copying frames in an interconnecting device, none was found which even recognizes the identified problems, much less provide a device and/or method which solves the identified problems.

SUMMARY OF THE INVENTION

It is, therefore, an object of the present invention to provide a LAN switch which is low cost and more adaptive to users' networks than was hereto possible.

It is another object of the present invention to provide a LAN switch which handles many additional network configurations than was heretofore been possible.

The above and other objects are made possible by implementing a distributive copy function in the LAN switch. The distributive copy function includes a common "Address Match Line" which each port adapter card can set and monitor. If a port adapter card finds a match between a stored address and an address of a frame on the switch fabric, the frame is copied for subsequent transmission to the port and attached LAN segment or device and the Address Match Line is set or activated. The activated Address Match Line is an indication to the other port adapter cards that the frame has been copied and that they may terminate their searching activities. If the Address Match Line is not set and a control function (such as a controlled bit of the port adapter card) is set or activated, the port adapter card copies and forwards the frame to the LAN segment or devices connected to its port.

In addition, several network configurations (set forth hereinafter) are made possible by the distributive copy function.

The invention may be further understood by the below detailed description of a specific embodiment taken in light of the accompanying drawings and appended claims.

DETAILED DESCRIPTION OF THE PREFERRED EMBODIMENT

Figure 1:
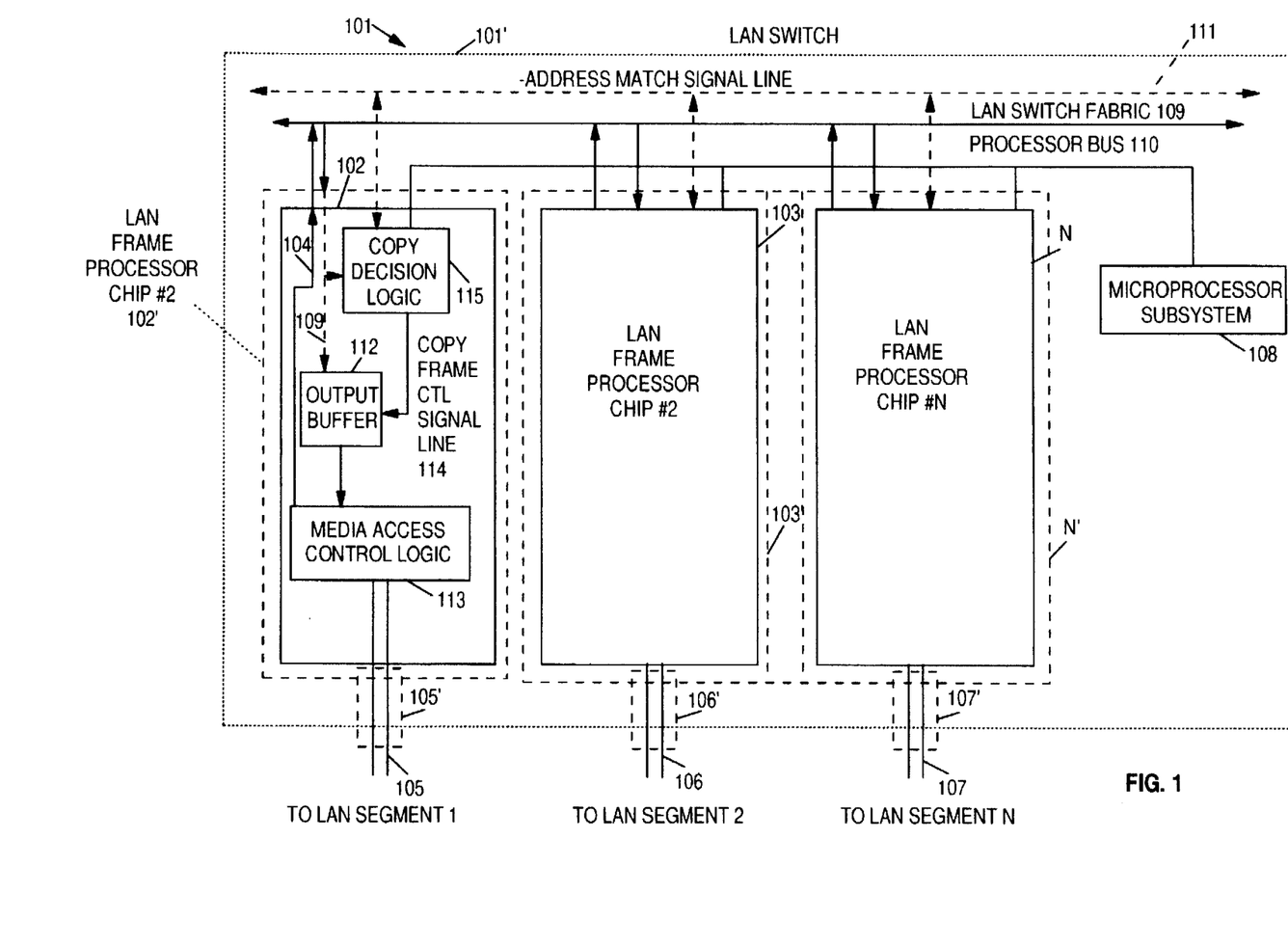
FIG. 1 shows the LAN Switching System according to the teachings of the present invention.

FIG. 1 shows a schematic representation of the switching system (hereafter LAN Switch 101) interconnecting a plurality of LAN segments so that stations (not shown) on different LAN segments can communicate via the LAN switch. The LAN Switch 101 includes a LAN switch fabric 109 interconnecting a plurality of port adapter cards, only some of which are shown in the figure and are identified as 102', 103' ... N'. Even though only three adapter cards are shown, in an actual switch N is greater than three (3) and the dots between 103' and N' indicates that additional adapter cards could be added. Each adapter card is connected to switch housing 101' by ports 105', 106' ... 107'. As with the number of adapters, the number of ports are usually more than three (3) and matches the number of port adapter cards in the switch assembly. LAN Media 105 interconnects Port 105' to LAN Segment 1 (not shown). Similarly, Port 106' is connected to LAN Segment 2 (not shown) by LAN Media 106 and so forth. It should be noted that when additional ports are added to the LAN switch, each port is connected by respective LAN media to its associated LAN segment. In addition, the respective LAN media interconnects a station or device or LAN segment (media and a plurality of connected devices) to a port.

Still, referring to FIG. 1, the port adapter cards are identical and the structure and description of one is intended to cover the structure and description of all. The function of the port adapter card is to transfer data from the LAN segment connected to its respective LAN media to the LAN Switch Fabric 109 interconnecting the port adapter cards and vice versa. The LAN Switch Fabric 109 transports LAN frame which are copied by respective port adapter cards. The LAN switch fabric, as a transport mechanism, is well known in the prior art and it can be implemented in various ways. For example, a simple implementation would be a parallel data bus or the like. Since switch fabrics are well known in the prior art, further description of the details will not be given in this specification.

Each port adapter card is provided with a LAN frame processor chip identified as LAN Frame Processor Chip#2, LAN Frame Processor Chip#2 ... LAN Processor Chip # N. The LAN frame processor chips are identical and the structure and description of one is intended to cover the structure and description of the other. The LAN frame processor chips are interconnected by Microprocessor Subsystem 108 over Processor Bus 110. The Microprocessor Subsystem 108 provides control functions for the LAN switch. Among the control functions provided are network management, configuration, initialization, statistics collection, control of the LAN frame processor chips and so forth. The microprocessor subsystem 108 typically includes a microprocessor, RAM, timer, and a non-volatile storage (e.g. flash) to store instructions and configurations. The microprocessor subsystem 108 connects to the LAN frame processor chips via the Processor Bus 110.

In addition, an Address Match Signal Line 111 interconnects the LAN frame processor chips. As will be explained subsequently, when a LAN frame processor chip copies a frame from the LAN Switch Fabric 109 it sets or activates the Address Match Signal Line 111 to a predetermined state, which informs the other LAN frame processor chip to abort any search activity since the frame is already copied by a LAN frame processor chip. In the preferred embodiment of this invention, the Address Match Signal Line 111 is provided with a negative active signal to indicate that it has been activated. It should be noted that although FIG. 1 shows each LAN frame processor chip as a discrete element (such as a VLSI module), multiple LAN frame processor chips could be provided on the same VLSI module. Therefore, the showing in FIG. 1 is only tutorial and should not be construed as a limitation upon the scope of the present invention.

Still referring to FIG. 1, each of the LAN frame processor chips includes Media Access Control Logic 113, Output Buffer 112, and Copy Decision Logic 115. The Copy Decision Logic 115 is connected to Output Buffer 112 by Copy Frame Control Signal Line 114 and to the LAN Switch Fabric 109 by Conductor 109. The Media Access Control Logic 113 monitors its LAN Media 105 for LAN frames. The mechanism used to detect LAN frames is dependent on the type of LAN. For example, if LAN Media 105 connects an ethernet LAN segment to port 105', the Media Access Control Logic 113 would be compatible with the ethernet protocol. Similarly, if the LAN segment which is attached is a Token Ring LAN segment, the media access control logic would be compatible with the Token Ring protocol and so forth. Since these types of media access control logic circuit arrangements are well known in the prior art, further description of the details are not warranted and will not be described further.

Upon detecting a LAN frame, the LAN Frame Processor Chip 102 copies the LAN frame from the LAN media and passes it on Conductor 104 to the LAN Switch Fabric 109, interconnecting the other LAN Frame Processor Chips 103 ... N. It should be noted that all LAN frame processor chips perform the same function. Therefore, all LAN frame processor chip copy LAN frames from their respective LANs and forwards them to the Switch Fabric from whence the frames are distributed to other LAN frame processor chips. As a consequence, stations on different LAN segments is made to communicate via the LAN Switch Fabric 109.

Still referring to FIG. 1, the Copy Decision Logic 115 in each LAN frame processor chip is controlled by Microprocessor Subsystem 108 over Processor Bus 110. The Copy Decision Logic 115 (in each LAN frame processor chip) can source control signals to Address Match Signal Line 111 and monitors the Address Match signal line. Before discussing the Copy Decision Logic 115 in greater detail, it is worthwhile discussing the structure of a LAN Frame. The typical LAN Frame, at a minimum, has in its header section a source address field and a destination address field. As is well known to those skilled in the art, the source address field in the frame indicates the origin or source of the frame while the destination address field indicates the destination (sink) to which the frame is to be delivered.

Usually, the respective address fields are six (6) bytes in length. As is well known to those skilled in the art, the frame has other fields not germane to the present invention and will not be described further.

Referring again to FIG. 1, the Copy Decision Logic 115, in each LAN frame processor chip, monitors the six byte destination MAC address field of the LAN frame on the LAN Switch Fabric 109 to make a determination as to whether or not the frame should be copied. Details of the circuit arrangement used to make the decision will be given hereinafter. Suffice it to say at this time, if the Copy Decision Logic 115 determines that the current LAN frame should be copied, it activates the Copy Frame Control Signal Line 114 to enable copying the frame into its Output Buffer 112. This output buffer is used by the LAN frame processor chip to hold one or more LAN frames until they can be transmitted onto its corresponding LAN media by its Media Access Control Logic 113. If the Copy Decision Logic 115 determines that the current LAN frames are not to be copied, it deactivates the copy frame control signal on the Copy Frame Control Signal Line 114 and the LAN frame is not copied into the Output Buffer 112. In essence, when the frame is not to be copied, it is simply ignored by the LAN frame processor chip. Of course, management of the LAN Switch Fabric 109 is built into the LAN Switch Fabric 109 and is beyond the scope of the present invention. It should be noted that although this procedure is described in the context of the LAN Frame Processor Chip 102, it is carried on in parallel and independently by each LAN frame processor chip in the LAN switch. It is also possible for more than one LAN frame processor chip to copy the same LAN frame from the LAN switch fabric and passes it to its respective LAN segment or attach device.

Figure 2:
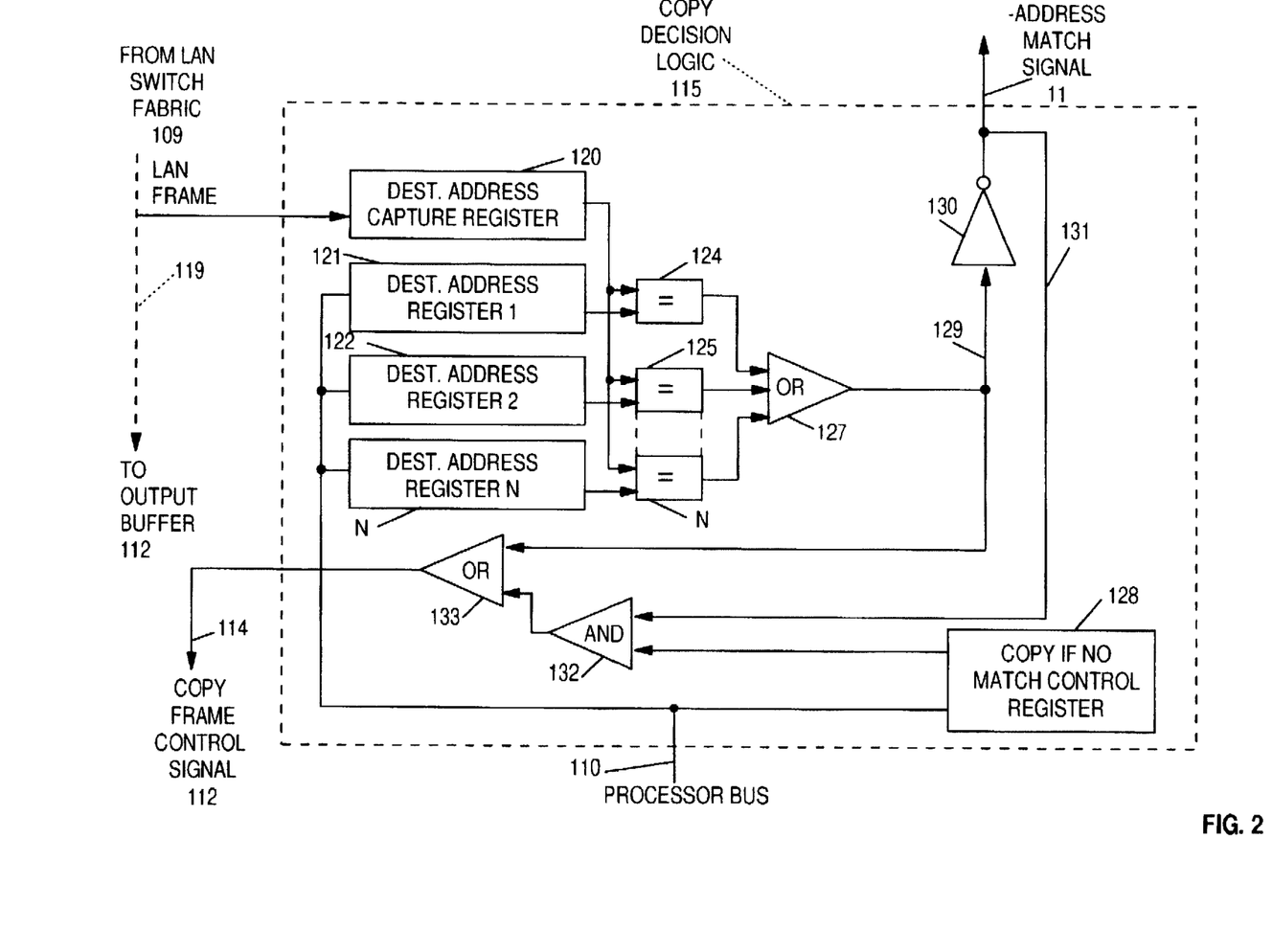
FIG. 2 shows details of the copy decision logic according to the teachings of the present invention.

FIG. 2 shows a circuit diagram for the Copy Decision Logic Means 115 in FIG. 1. For simplicity, elements in FIG.

2 which are common to elements in FIG. 1 are identified by like numerals. The Copy Decision Logic Means 115 includes a plurality of Destination Address Register 120, 121, 122 ... N connected to Comparators 124, 125 ... N. The output from the comparators are coupled by conductors to logical OR Circuit 127. The output from the logical OR Circuit 127 is connected to Conductor 129 which connects to the input of an Inverter Circuit Block 130 and an input of OR Circuit 133. The output from the Inverter Circuit Block 130 is dot OR'ed into the Address Match Signal Line 111. The output from Inverter Block 130 is also connected to one input leg of AND Circuit 132. The other input to AND Circuit Means 132 is from the output of "Copy If No Match Control Register 128". The output from AND Circuit 132 is connected to the other input of OR Circuit 133. The output from the OR Circuit 133 is tied to the Copy Frame Control Signal Line 114. The registers are connected by Processor Bus 110.

Still referring to FIG. 2, the Copy Decision Logic 115 in each LAN frame processor chip is controlled by the Microprocessor 108 via the Processor Bus 110. The Copy Decision Logic Registers 121, 122 and 123 are "configured" by the Microprocessor Subsystem 109 over the Processor Bus 110. Each of the LAN frame processor chip registers are set independently. These registers are six bytes address registers and are set with a value for each LAN station on the LAN segment. For example, in FIG. 2 there are three (3) destination address registers. Therefore, this copy destination logic would copy information for three stations. Of course, the number of registers can be greater or less than three. The microprocessor subsystem (FIG. 1) sets each of these registers with the MAC addresses of a different LAN station attached to its LAN media. If there are more registers than known MAC addresses, then the extra registers are loaded with an invalid MAC address. The mechanism used to determine the MAC addresses of the attached LAN station is beyond the scope of the present invention and further details will not be given here. Suffice it to say that the MAC addresses of the attached stations can be set manually by the user or via an address learning technique where the source MAC address of all received LAN frames is monitored for previously unknown addresses.

Still referring to FIG. 2, the Destination (Dest.) Address Capture Register 120 captures the address from the LAN Switch Fabric 109 and stores it. In addition, the No Match Control Register 128 stores a value which causes the copying of a frame from the LAN switch fabric even though an address stored in the destination address register does not match an address on the switch fabric. In one embodiment, the No Match Control Resister 128 register is a single bit register. When set in an "off" state, this LAN frame processor chip will only copy LAN frame from the LAN Switch Fabric 109 if the LAN frame destination MAC address in the Destination Capture Register 120 matches one of the values loaded in its Destination Address Register 121, 122 or N. When set in an "on" state, this LAN frame processor chip will copy LAN frames from the LAN Switch Fabric 109 if the LAN frame destination MAC address matches one of the values loaded into its Destination Address Register 121, 122 or N, and also will copy LAN frames from the LAN Switch Fabric 109 that did not match the destination address register in any of the other LAN frame processor chips in the entire LAN switch.

In operation, when a LAN frame is present on the LAN Switch Fabric 109, it is seen by the Copy Decision Logic 115 of each LAN frame processor chip. The Copy Decision Logic 115 latches the six byte destination MAC address of the LAN frame into its Destination Address Capture Register 120. This latched contents is compared to the loaded address in each Destination Address Register 121, 122 and N using independent six byte comparators 124, 125 and N respectively. The outputs of the comparators are OR'ed by OR Circuit 127 to indicate whether any of them detected a match as indicated by the signal on Conductor 129 being active. The signal on Conductor 129 is inverted by Inverter 130 and dot OR'ed onto the Minus Address Match Signal Line 111, driving it low, which is connected to the other LAN frame processor chips (see FIG. 1). Since all of the LAN frame processor chips are performing this same operation, the -Address Matched Signal 111 is driven active low if the destination MAC address of the current LAN frame on the LAN Switch Fabric 109 was recognized by any LAN frame processor chip. If this LAN frame processor chip matches the destination address of the current LAN frame, then its signal on Conductor 129 will be active and via the OR Circuit 133 it will instruct its Output Buffer 112 (FIG. 1) to copy the LAN frame on Conductor 119 by activating its Copy Frame Control Signal Line 114 (FIG. 1).

Furthermore, this invention provides an added level of function by copying LAN frames when the destination MAC address is not known by any of the LAN frame processor chips (i.e. the microprocessor subsystem did not load the MAC address into any of the destination address registers). This function is enabled when the Copy If No Match Control Register 128 is loaded by the Microprocessor Subsystem 108 into an ON state. When this LAN frame processor chip does not recognize the address of the current LAN frame on Conductor 119, the Comparators 124, 125 and N all generate an inactive signal which, when OR'ed with OR Gate 127 generates an inactive signal on Conductor 129. The inactive signal is inverted by Inverter 130. Due to the dot OR'ed nature of the signal, it does not drive the -Address Match Signal 111. If another LAN frame processor chip recognizes the MAC address of this LAN frame, it would drive the Signal Line 111 active low. In this case, the receive version of the signal on Conductor 131 will be low and will disable the AND Circuit Gate 132. Consequently, the OR Circuit Gate 133 and the copy frame control signal on Copy Frame Control Signal 114 will be low. In this case, the LAN frame will be ignored. If no other LAN frame processor chip recognizes the MAC address of this LAN frame either, then the -Address Match Signal on -Address Match Signal 111 will be pulled high (no one driving it low). Therefore, the received version of this signal in Inverter 130 will now be high, resulting in the OR Gate 133 being active, just as if this LAN frame processor chip recognizes the destination MAC address in the current LAN frame. It, therefore, drives copy frame control signal on Copy Frame Control Signal Line 114 high, copying the LAN frame into its Output Buffer 112. In a similar way, the other LAN frame processor chips, if their "Copy If No Match Control Register 128" is set, will also copy the LAN frame, not matching an address in any of the LAN Frame Processor Chips.

Figure 3:
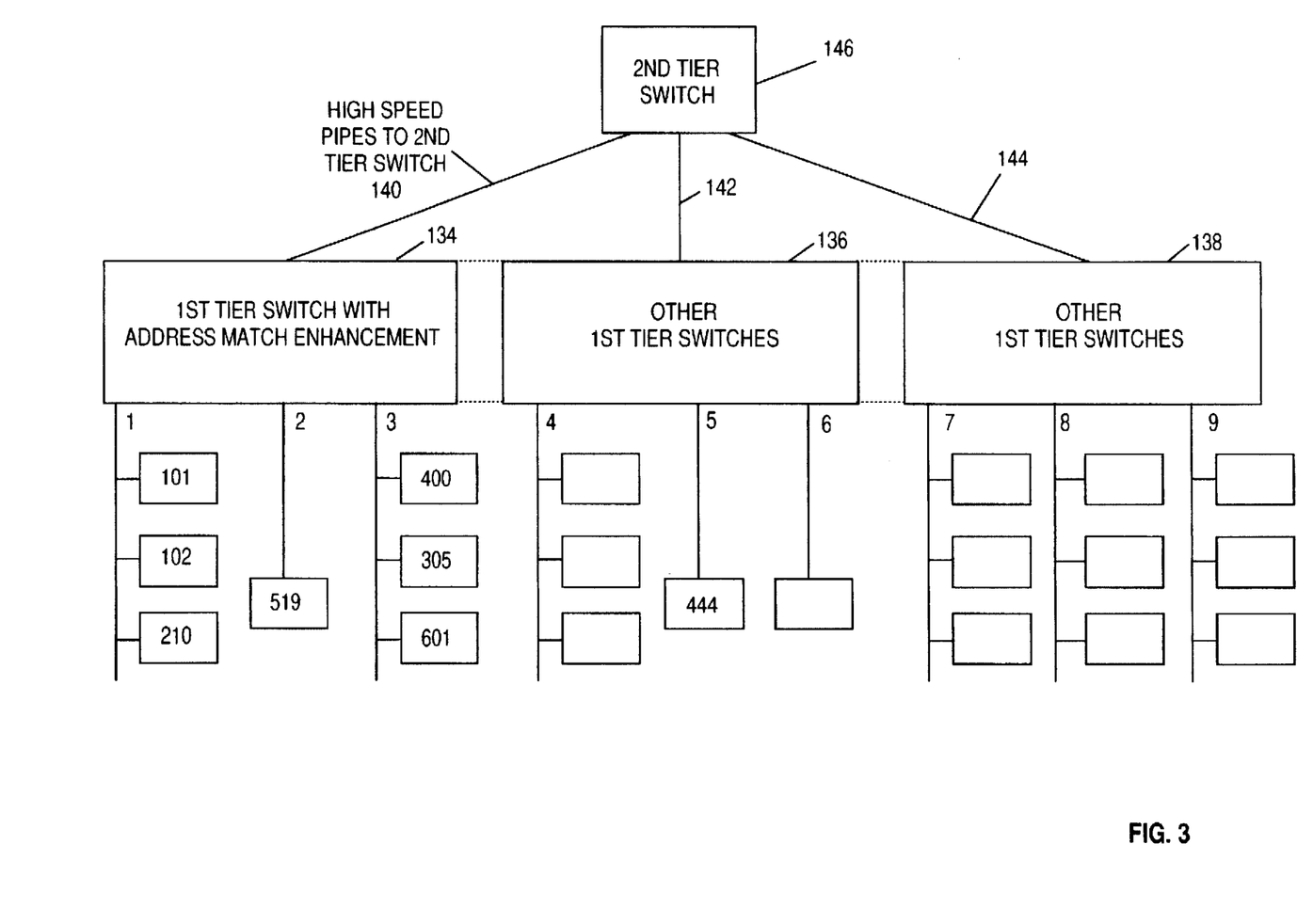
FIG. 3 shows a two-tier communications network, made possible by the present invention.

FIG. 3 shows a configuration of tiered switches which could not have been supported prior to the present invention. A plurality of first tier switch only three of which are shown and identified by numerals 134, 136 and 138 are connected over High Speed Pipes 140, 142 and 144 to a 2nd Tier Switch 146. The High Speed Pipes can be fiber optic links or any other high speed transmission media. Each of the switches are structured according to the teachings of the present invention described above. Switch 134 has three ports to which LAN segment with devices 101, 102 and 210 are connected to Port 1. A single device 519 is connected to Port 2 and a LAN segment with devices 400, 305 and 601 are connected to Port 3. Similarly, Switch 136 has LAN segment with devices connected to Ports 4, 5 and 6. Finally, 1st Tier Switch 138 has LAN segment with connected to Ports 7, 8 and 9. The rectangular blocks between the respective 1st Tier Switches indicate that the other switches with attached devices could be coupled to the 2nd Tier Switch 146.

As described above, each of the tier switches has copy decision logic for each port with the copy decision logic register set with the addresses of the attached downstream station. For example, the decision logic register for Port 1 Tier Switch 134 would be set with the MAC address for Stations 101, 102 and 210. For Port 2, the register would be set with the MAC address for Station 519. Likewise, for Port 3, the register would be set with MAC address for Stations 400, 305 and 601. In a similar manner, the port registers for the other switches would be set with stations' addresses by their respective processor. The LAN frame processor chip for each of the High Speed Pipe to the 2nd Tier Switch 146 would be set so that if the internal Address Match Signal line, in each first tier switch, is not set and the Copy If No Match Control Register, in each LAN frame processor chip, is set the LAN frame processor chip for each one of the High Speed Pipe copies the frame which is not copied by any of the other processor chips and is forwarded to the 2nd Tier Switch 146 for distribution. With this configuration, the 2nd Tier Switch is responsible for forwarding frames to the rest of the network. The local switch needs only to recognize the address associated with stations directly connected to its downstream ports and route frames with those addresses to the appropriate port. Any frames with unrecognized addresses will simply be transmitted to the High Speed Pipe up to the 2nd Ter Switch. For example, if frames for an address such as 444 is generated on 1st Tier Switch 134, the frame is transmitted via High Speed Pipe 140 to 2nd Tier Switch 146 and is distributed over High Speed Pipe 142 to 1st Tier Switch 136. As described above, the LAN frame processor chip associated with Port 5 would copy the frame from the switch fabric in first Tier Switch 136 and deliver it to 444.

Figure 4A:
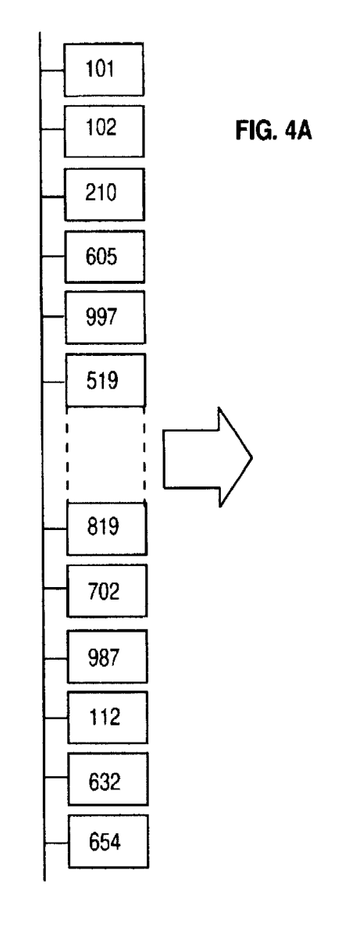
FIGS. 4A and 4B show a shared media LAN and replacement LAN Switching Network, respectively.
Figure 4B:
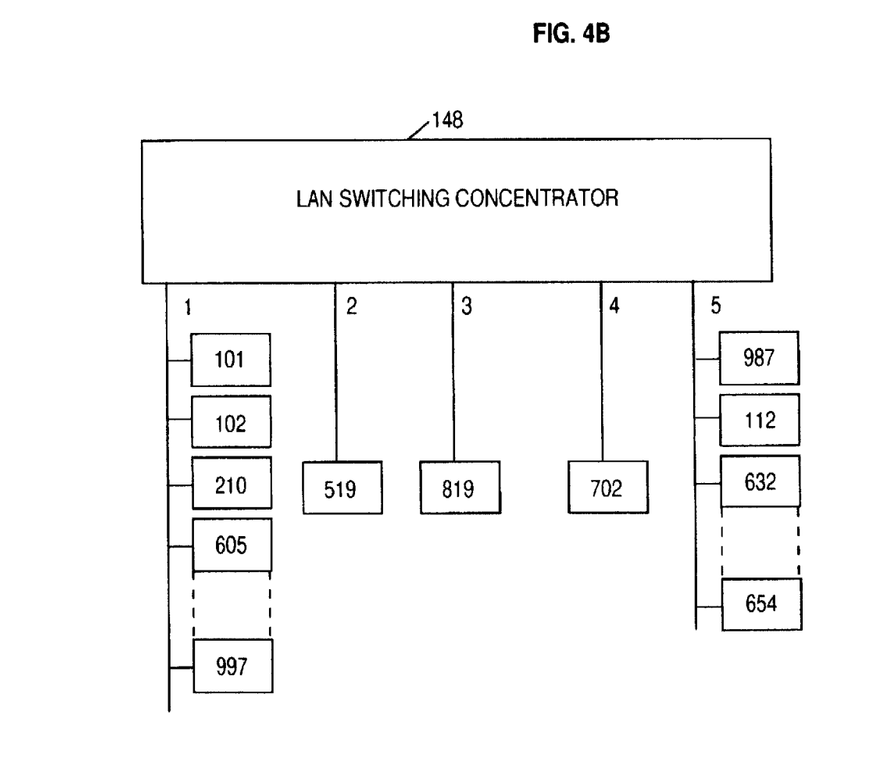

FIGS. 4A and 4B show a configuration in which a LAN switch (FIG. 4B) partitions the stations shown in the shared media LAN (FIG. 4A) into shared media connections on Ports 1 and 5 of LAN Switch 148 and dedicated media on Ports 2, 3 and 4. In the rearrangement shown in FIG. 4B, stations requiring high bandwidth such as high end workstations and servers can be placed on dedicated ports and the remaining stations can be placed on shared media ports. Note that with this invention, the number of stations on the shared media port is not constrained by the number of addresses that can be recognized by the LAN frame processor chips previously described. In this configuration (FIG. 4B), the addresses of the stations on the dedicated ports (519, 819 and 702) are loaded into the destination address registers of their associated LAN frame processor chips for dedicated Ports 2, 3 and 4, respectively. The Copy If No Match control register is set in the LAN frame processor chips for the shared media ports. Therefore, frames with destination address 519 will be recognized by the LAN frame processor chip for Port 2, and therefore will not be transmitted to any other media ports. This removes the high volume traffic from the shared media LAN segment, thus increasing the total system throughput.

Frames addressed to Station 210, for example, will not be recognized by any other LAN frame processors and will therefore be transmitted to all of the shared media Ports 1 and 5. It should be noted that in this case, the operation is similar to a network configuration where all stations are on the same media that is no LAN switch installed, but with the added value that this traffic with a known address does not burden to the stations on dedicated ports.

Figure 5:
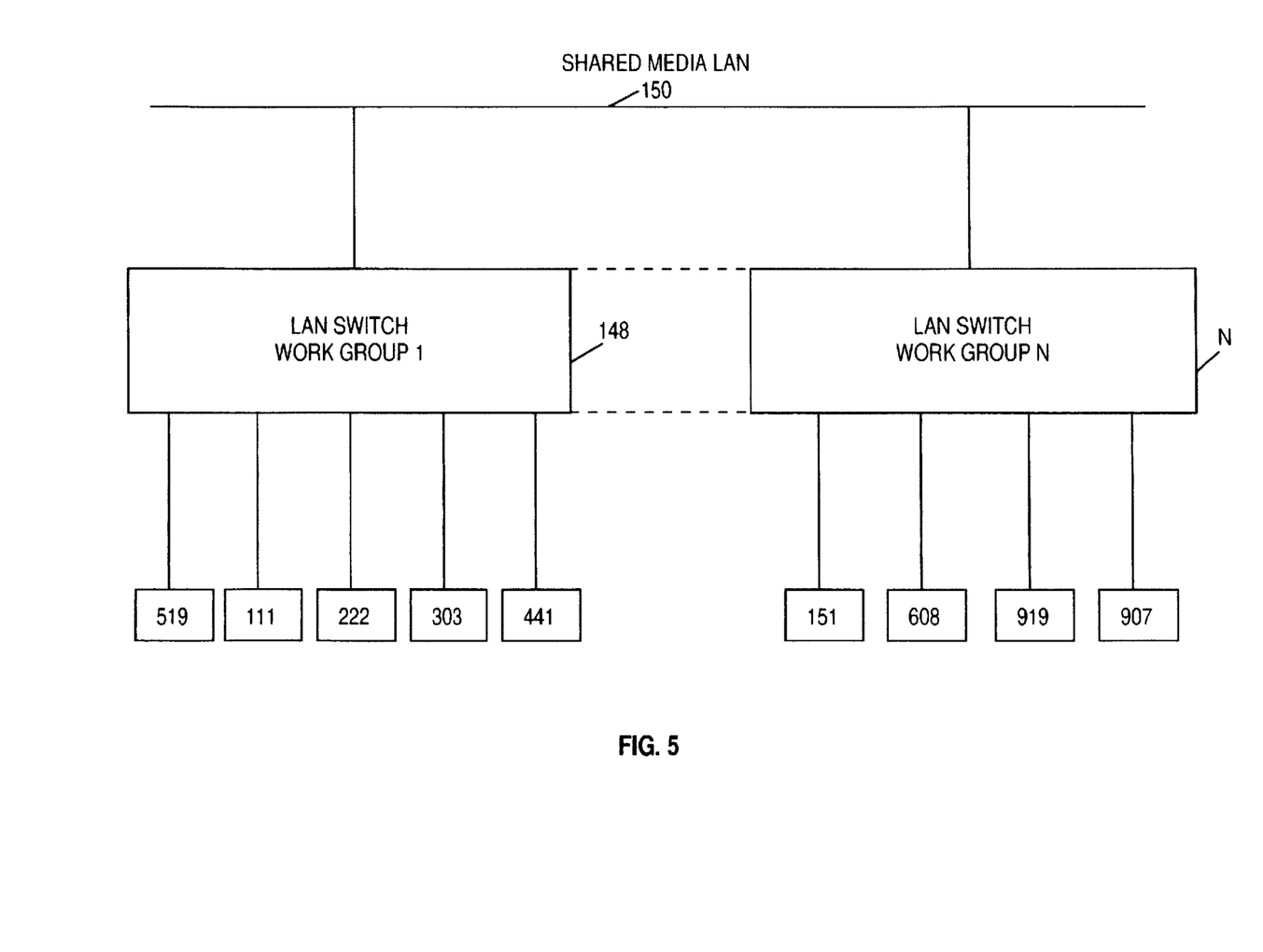
FIG. 5 show a LAN configuration in which a shared media LAN interconnects a plurality of work groups.

FIG. 5 shows another network configuration made possible by the present invention. In this configuration, LAN Switch 148 supports WorkGroup 1 which includes workstations 519, 111, 222, 303 and 441. Similarly, LAN Switch WorkGroup N supports workstations 151, 608, 919 and 907. Even though two LAN switches supporting different work groups are shown, additional work groups connected to different LAN switches can be added without departing from the scope of the present invention. The dots between LAN Switch 148 and LAN Switch N is an indication that additional LAN switches could be included in the configuration. In addition, each of the LAN switches can support more or fewer workstations than those shown in the figure. The LAN switches in each of the work groups are interconnected by Shared Media LAN 150. In this configuration, the LAN frame processor chips, for each port, are structured as set forth above. The respective address registers, for each port, are set with one address for the connected station. The operation of this configuration is substantially similar to the tiered system described above. The frames which are addressed to directly attached station on the same LAN switch are forwarded directly to the appropriate station. All other frames are placed onto the Shared Media LAN 150 and are copied by the appropriate LAN switch from the shared media and forwarded to the appropriate station. This configuration would apply where high volumes of traffic are passed between stations in the same LAN switch (e.g., CAD drawings exchanged between members of the engineering department) and low volumes of traffic passed between LAN switches (example, EMail between engineering and marketing departments).

While the invention has been particularly shown and described with reference to preferred embodiment, it will be understood by those skilled in the art that various changes in form and details may be made therein without departing from the spirit and scope of the invention.

Having thus described the invention, what we claim as new and desired to secure by Letters Patent is:

1. A LAN switch for interconnecting LAN segments and devices comprising:

a switching fabric;

a plurality of ports a control line for carrying a control signal; and a plurality of port modules coupled to the control line, the switching fabric plurality of ports with each one of the plurality of port modules including a first circuit arrangement for monitoring the switching fabric and analyzing frames thereon to determine if the frames are to be copied, a second circuit arrangement, coupled to the first circuit arrangement, for activating the control line if a frame is copied from the switching fabric and a third circuit arrangement, coupled to the second circuit arrangement, for monitoring the control line and if the control line is activated do not copy frames from the switching fabric.

2. The LAN switch of claim 1 wherein the first circuit arrangement includes at least one register for storing information identifying the frame to be copied;

a capture register for receiving information identifying a frame from the switching fabric; and     a circuit means for correlating information in the at least one register and the capture register to generate a control signal set to a first state if correlation meets a predetermined criteria.

3. The LAN switch of claim 1 wherein the second circuit arrangement includes a gating circuitry.

4. The LAN switch of claim 3 wherein the gating circuitry includes an inverter gate.

5. The LAN switch of claims 1 or 2 wherein the third circuit arrangement includes a gating circuitry.

6. The LAN switch of claim 5 wherein the gating circuitry includes an AND gate.

7. The LAN switch of claim 5 further including a register, with an output coupled to the gating circuitry, for storing a value identifying a frame, not having identifying information stored in the at least one register, to be copied.

8. The LAN switch of claim 1 further including a controller coupled to the port modules.

9. The LAN switch of claim 8 wherein the controller includes a microprocessor.

10. The LAN switch of claim 6 wherein the circuit means includes comparators.

11. In a LAN switch having a switching fabric interconnecting port adapter cards, with each port adapter card provided with a set of addresses identifying addresses of stations connected to the switch port which said adapter card serves and said adapter card is to copy a frame from said switching fabric if an address in the set of addresses matches an address in the frame, an apparatus for allowing an adapter card to copy a frame when the addresses of said adapter card do not match an address in a frame on said switch fabric comprising:

a control signal line;

a circuit arrangement for setting the control signal line to a first state if the port adapter card copies a frame from the switching fabric;

a register for receiving a control bit which sets the register to an active state if the frame not having a matching address is to be copied; and a circuit arrangement for monitoring the register and the control line and to generate a copy frame control signal that enable the adapter card to copy the frame if the signal line is not set to the first state and the register is in the active state.

12. In a LAN switch having a switching fabric for transporting frames, a plurality of ports for connecting to LAN segments and devices and port modules for interconnecting the ports to the switching fabric, a method for copying frames from the switching fabric to the port modules comprising the steps of:

providing an address match line for connecting the port modules;

providing in respective port modules a set of addresses for stations connected to said respective port modules;

correlating addresses in frames on said switching fabric with addresses stored in the respective port modules;

copying, from the switching fabric into a port module, frames whose addresses match addresses stored in the port module;

setting the address match line to an active state by the port module copying a frame from the switching fabric;

monitoring, by the port modules, the address match line; and do not copy the frames from the switching fabric by any other port modules if the address match line is set.

13. The method of claim 12 further including the steps of providing an indicator on at least one of the respective port modules; and copying a frame from the switch fabric if the address match line is not set and the indicator is set in an active state.

14. A LAN switch including;

a switch fabric;

a control line;

a Copy If No Match Register;

first means for comparing an address in a frame on said switch fabric with an address stored in said first means;

second means, being responsive to the first means, for copying the frame if the addresses match;

third means, responsive to the first means, to activate the control line, if the frame is copied; and fourth means, operatively coupled to the first means, the Copy If No Match Register and the third means, for causing the second means to copy the frame if the addresses do not match, the control line is not activated and a bit in the Copy If No Match register is set.

15. The LAN switch of claim 14 wherein said second means dose not copy the frame if the addresses do not match and control line is not activated.

16. A device for use in a communications network comprising:

a housing;

a switch fabric mounted within the housing;

a plurality of ports coupled to the housing;

a control line for carrying control signal mounted within the housing;

a plurality of port modules coupled to the control line, the switching fabric and the plurality of ports with each one of the plurality of port modules including a first circuit arrangement for monitoring the switching fabric and analyzing frames thereon to determine if the frames are to be copied, a second circuit arrangement, coupled to the first circuit arrangement, for activating the control line if a frame is copied from the switching fabric and a third circuit arrangement, coupled to the second circuit arrangement, for monitoring the control line and do not copy frames from the switching fabric if the control line is activated.

* * * * *